Figure 1:
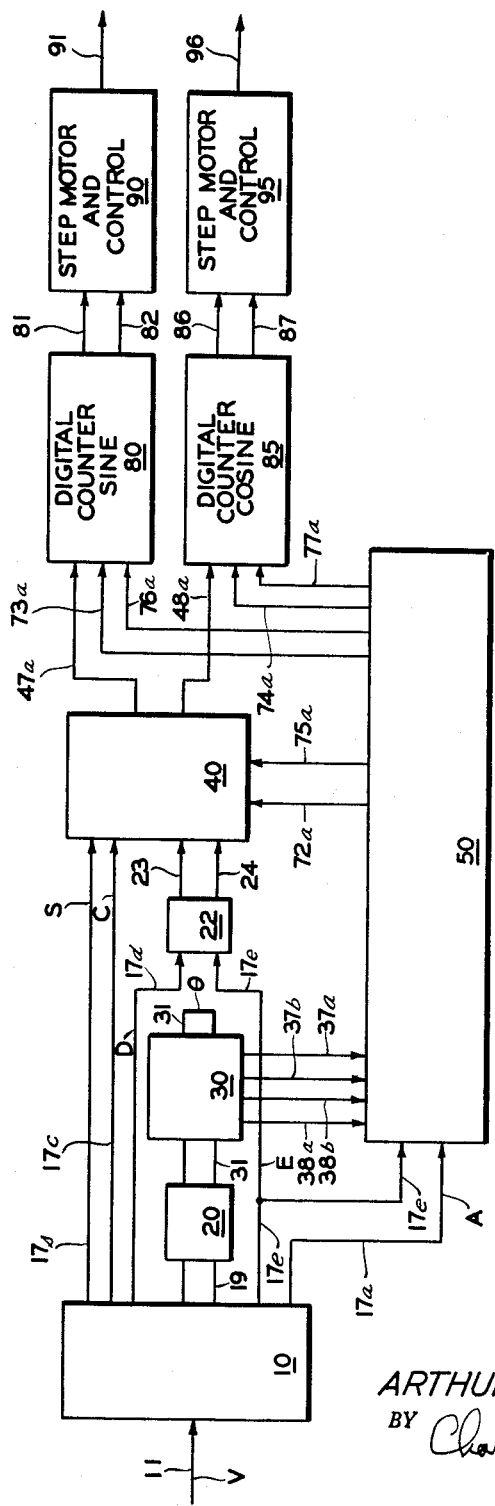

INVENTOR.
ARTHUR S. ROBINSON
BY Charles J. Worth
AGENT

April 27, 1965      A. S. ROBINSON      3,180,976
DIGITAL RESOLVER-INTEGRATOR
Filed Nov. 8, 1960

| SHAFT 31 $\theta =$ | PICKUP 16θ IN QUADRANT | 2 BIT REFLECTED BINARY CODE | | STATE OF GATE | | SINE TRACK PULSES TO | | | COSINE TRACK PULSES TO | | |
|---|---|---|---|---|---|---|---|---|---|---|---|
| | | | | 63 | 64 | COUNTER | DIRECTION | | COUNTER | DIRECTION | |
| 0°–90° | 1 | 0 | 0 | X° | Y° | SINE 80 | UP | | COSINE 85 | UP | |
| 90°–180° | 2 | 0 | 1 | X° | Y' | COSINE 85 | UP | | SINE 80 | DOWN | |
| 180°–270° | 3 | 1 | 1 | X' | Y' | SINE 80 | DOWN | | COSINE 85 | DOWN | |
| 270°–360° | 4 | 1 | 0 | X' | Y° | COSINE 85 | DOWN | | SINE 80 | UP | |

FIG. 5

INVENTOR.
ARTHUR S. ROBINSON
BY Charles J. Worth
AGENT

3,180,976
DIGITAL RESOLVER-INTEGRATOR

Arthur S. Robinson, Allendale, N.J., assignor to The Bendix Corporation, Teterboro, N.J., a corporation of Delaware
Filed Nov. 8, 1960, Ser. No. 68,086
10 Claims. (Cl. 235—189)

This invention relates to computers and more particularly to resolver-integrators for computers to provide an output corresponding to rate and angular functions.

A device constructed according to the invention is particularly adapted to navigational computers providing visual map indications movable along rectilinear coordinates or distance flown information. The novel device uses solid state circuitry, and has high resolution provided by digital systems.

An object of this invention is to derive integrated digital signals representing vector components in response to analog signals.

Another object of this invention is to provide an analog to digital device for resolving and integrating digital signals representing vector components corresponding to rate and angle, in which the rate and/or the angle are variable.

Another object of this invention is to use a first encoder to provide signals as a function of an angle which may vary from 0 to 90 degrees in any of the four polar quadrants, and a second encoder to derive signals representing the polar quadrants.

Another object of this invention is to provide a device of the kind described which is compact, rugged, and capable of high resolution.

This invention contemplates an analog to digital resolving and integrating device for deriving an output representing vector components. The device includes encoder means for receiving analog signals representing rate and angle information for deriving gate control pulses and two trains of pulses at a rate corresponding to the instantaneous rate of the rate signal, each train of pulses representing a function of the instantaneous angle of the signal providing angle information. Gate means connects the encoder means and selectively transmits the trains of pulses to output means in response to the gate control signals. Each output means provides an output representing an angular function that corresponds to the sum of the pulses of the associated trains of pulses received during a period of time.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
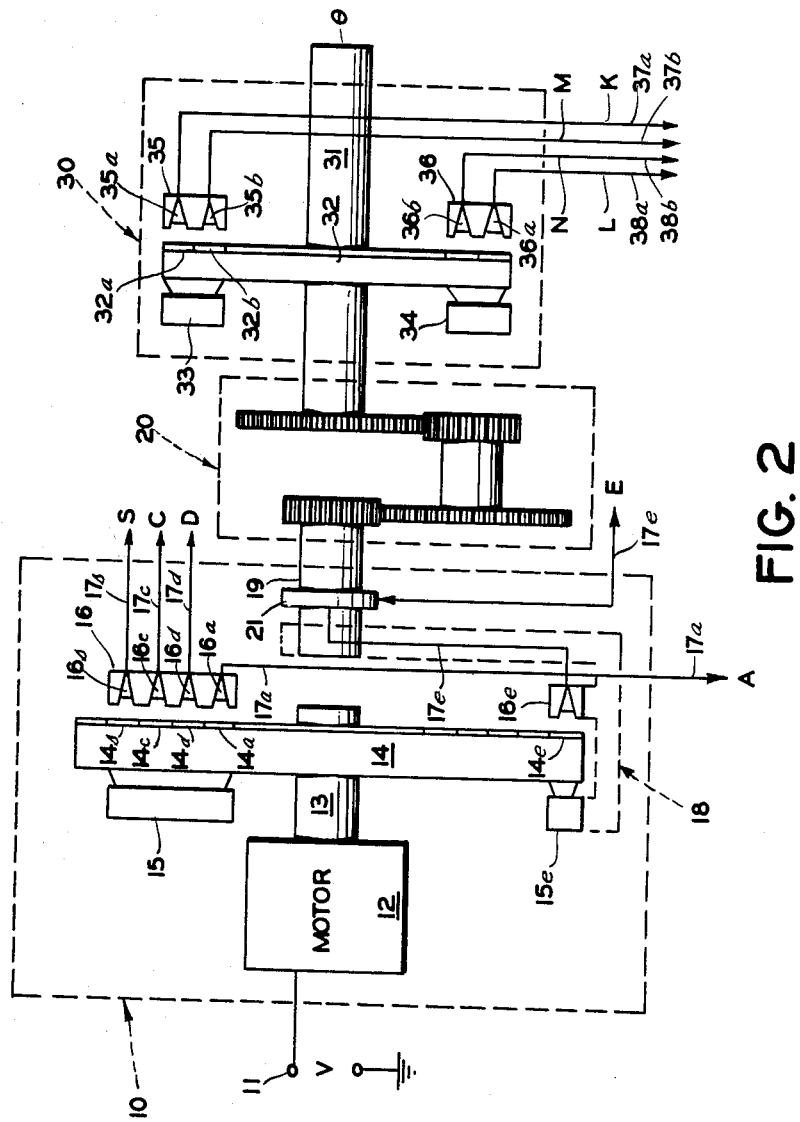
Figure 3:
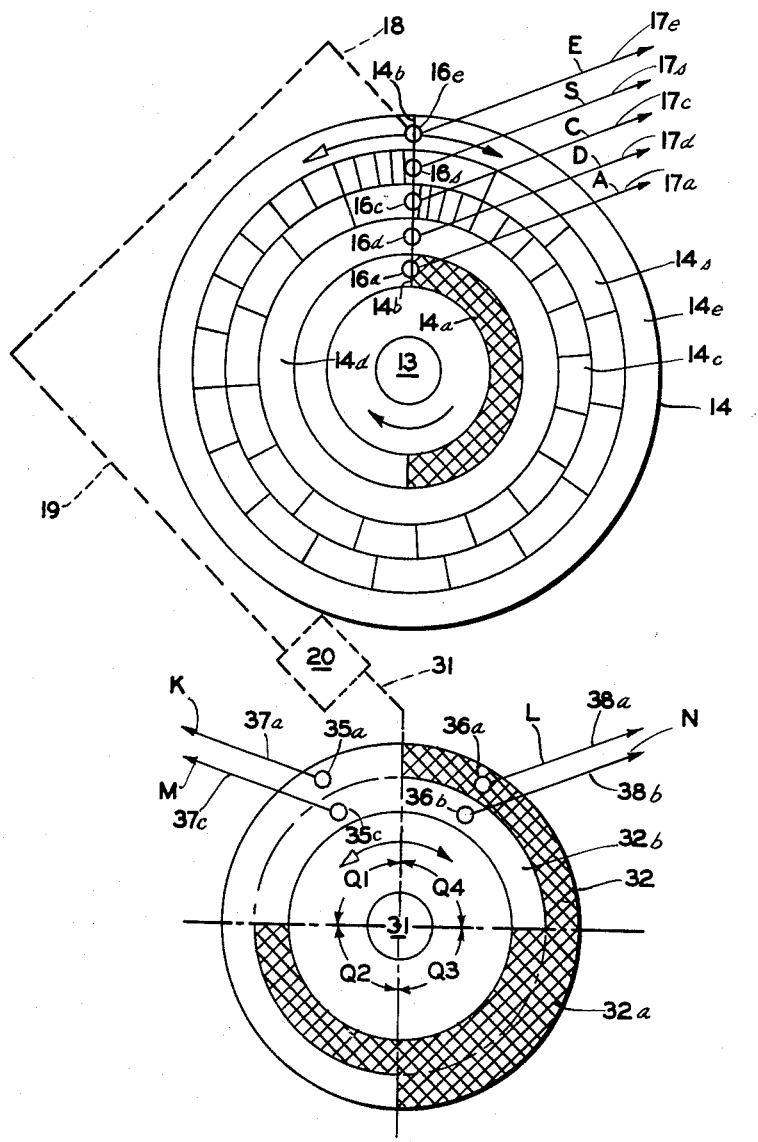
Figure 4:
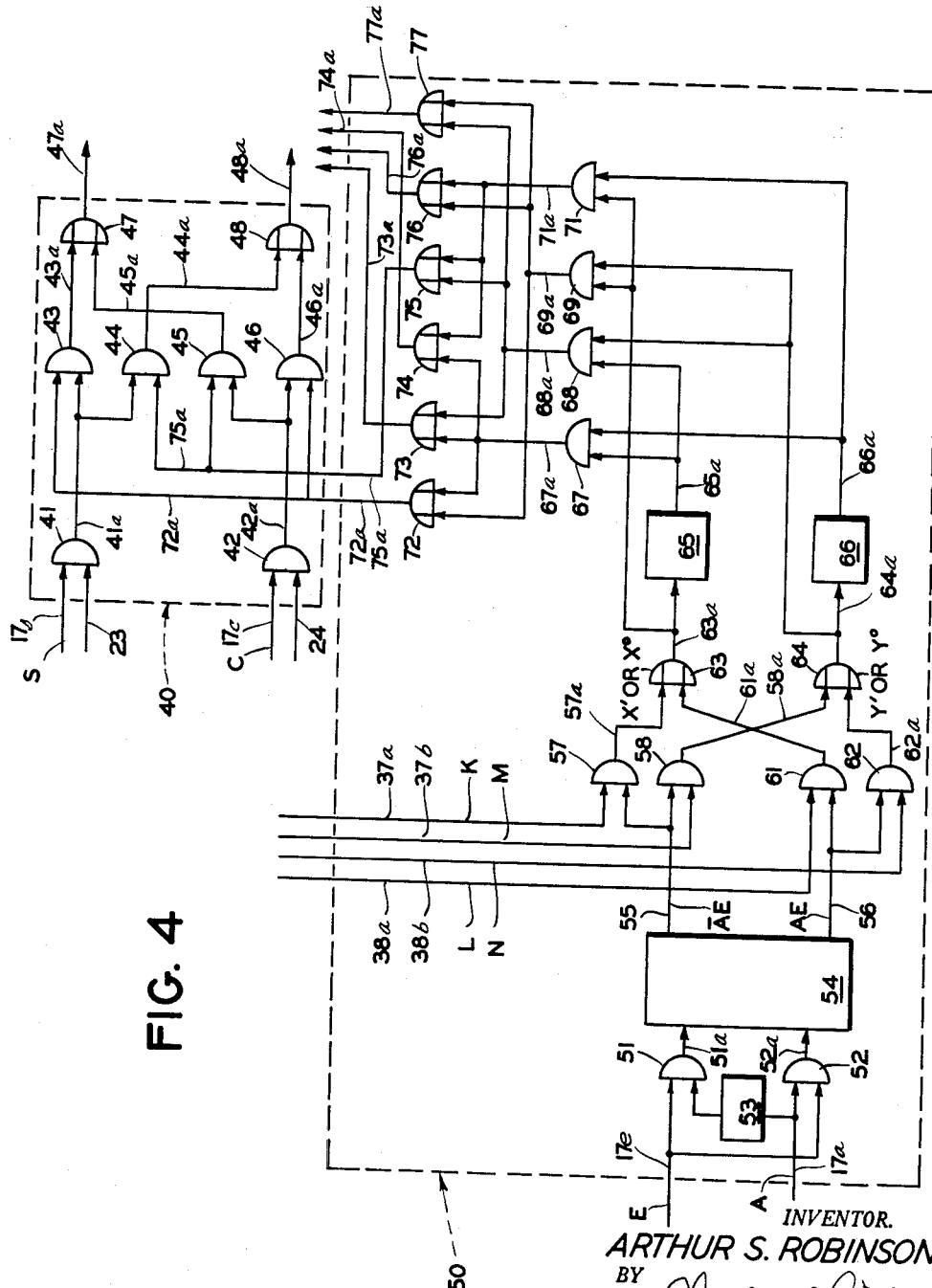

FIGURE 1 is a functional block diagram of a novel device constructed according to the invention, FIGURE 2 is a schematic view of the encoders of the device of FIGURE 1, FIGURE 3 is a schematic diagram of the encoder memory members of FIGURE 2 showing the stored information thereon, FIGURE 4 is a circuit diagram of a signal gating network and a signal control network of the device of FIGURE 1, and, FIGURE 5 is a chart showing correspondence of signal control derivation and signal application in response to analog signals representing angles included in any of the four polar quadrants.

Referring now to the drawings the novel device shown in FIGURE 1 comprises a function encoder 10 having an input 11 for receiving signals V representing an instantaneous rate. The function encoder 10 derives rate modulated gate control pulses D and E, antiambiguity signals A, and trains of sine function pulses S and cosine function pulses C. A two bit encoder 30 derives a combination of signals K, L, M and/or N, or the absence thereof, in response to positioning of an input shaft 31 to indicate the polar quadrant that includes an instantaneous angle $\theta$.

The trains of sine and cosine function pulses S and C are applied to a signal gating network 40 to be applied to bidirectional counters 80 and 85 in response to control signals from a flip flop 22 and a logic or control signal network 50. Network 50 also applies signals to counters 80 and 85 for controlling the direction of counter operation; i.e. count-up or count-down. Signals D and E from encoder 10 are periodically applied to alternately set and reset flip flop 22. Counters 80 and 85 are merely pulse count dividing means. Each counter 80 or 85 provides one output control pulse to a step motor and its control 90 or 95, respectively, in response to each predetermined number of input pulses provided by the trains of pulses S and C that are applied thereto. Step motor 90 or 95 operates in a direction determined by count-up or count-down operation of its associated counter. This may be modified within the scope of the invention (not shown) by using a unidirectional digital counter, and applying directional control signals from network 50 to the step motors and their controls 90 and 95.

Referring now to FIGURES 2 and 3, encoder 10 includes a motor 12 connected to the input 11 for receiving signals V representing velocity or rate. Motor 12 has a shaft 13 supporting and rotating clockwise in unison with member 14 at a speed proportional to the instantaneous rate in response to signals V. It should be understood that while member 14 is shown and will be described as an optical disc, it may be an optical or magnetic disc or drum memory device.

Disc 14 has five circular signal deriving tracks 14e, 14s, 14c, 14d, and 14a disposed sequentially inwardly from one another with the sequence commencing, preferably as shown in FIGURE 3 at the disc periphery. Although the tracks extend 360 degrees, their scalar value is set at a ratio of 1 to 4, thus the tracks represent a sweep of 90 degrees. A reference mark 14b extends radially across all of the tracks providing a reference signal line in tracks 14d and 14e. Tracks 14s and 14c are comprised of clock lines plotted relative to a 90 degree sine curve and a 90 degree cosine curve, respectively, each commencing at the reference line 14b. Track 14a is devised to produce a signal with only one half the track, representing a 45 degree scalar sweep, commencing 180 degrees from reference line 14b when scanned. The various clock lines, reference lines, and signal track portions may be transparent on an opaque base or vice versa. The former is used to illustrate the invention, cooperating with light sources 15 and 15e, and light responsive devices 16 and 16e for producing signals as disc 14 rotates.

Light source 15 is fixedly disposed on the motor side of disc 14 and applies concentrated light rays to tracks 14s, 14c, 14d, and 14a. A fixed light sensitive head 16 is aligned with source 15 and is disposed on the opposite side of disc 14. Head 16 has sensors 16s, 16c, 16d, and 16a energized by the light rays from source 15 passing through the various associated clock lines and transparent track positions of tracks 14s, 14c, 14d, and 14a, respectively, as disc 14 rotates.

Light source 15e is also disposed on the motor side of disc 14 and passes light to energize a sensor 16e, disposed on the face side of disc 14, when clock or reference pulse line 14b of track 14e passes through the light rays. Light source 15e and sensor 16e are carried on an arm 18 mounted on a rotatable shaft 19. Shaft 19 extends into and has a gear in mesh with gear train 20 to provide a 4 to 1 ratio of rotation of arm 18 in response to rotation of shaft 31. Thus, light source 15e and sensor 16e are angularly displaced a scalar distance, representing angle $\theta$ relative to a polar quadrant, from fixed light source 15 and sensor head 16, respectively, by $\theta$ displacement of shaft 31.

Sensors 16s and 16c have output lines 17s and 17c, respectively, for transmitting respective trains of pulses S and C to gating network 40. Sensor 16d has an output line 17d for transmitting pulses D to the "set" connection of flip flop 22, while sensor 16a has an output line 17a for transmitting antiambiguity signals A to signal control network 50. Sensor 16e has an output line 17e including a slip ring 21 mounted on shaft 19 for transmitting pulses E to the "reset" connection flip flop 22 and simultaneously to network 50.

The two bit encoder 30 is comprised of input shaft 31 supporting and rotatable in unison with an encoder disc 32, and having a gear in mesh with gear train 20. Disc 32 is divided into four quadrants Q1, Q2, Q3, and Q4, and has two adjacent tracks 32a and 32b at its periphery. Each of the tracks are divided into halves, one opaque and the other transparent. The halves of one of the tracks are angularly displaced 90 degrees from the halves of the other track. A pair of light sources 33 and 34 are disposed on one side of disc 32, angularly displaced from one another. A light responsive head 35 having sensors 35a and 35b is disposed on the other side of disc 32 opposite light source 33 while similar head 36 having sensors 36a and 36b is angularly displaced from head 35 and is disposed opposite light source 34.

Encoder disc 32 is similar to disc 14 and is opaque with transparent track portions for passing light rays from sources 33 and 34 to heads 35 and 36, respectively, to provide signals K, L, M and/or N. Sensors 35a and 35b are responsive to the light rays from source 33 and have output lines 37a and 37b, respectively, for transmitting respective signals K and M to network 50. Sensors 36a and 36b are responsive to light rays from source 34 and have output lines 38a and 38b, respectively, for transmitting respective signals L and N to network 50. The transparent track portions of the disc 14 and 32 are indicated in the drawings as being hatched or lined.

The two bit encoder 30 with its component parts arbitrarily utilizes a reflected binary code wherein "0 0" indicates the first polar quadrant Q1, from 0 to 90 degrees; "0 1" indicates the second polar quadrant Q2 from 90 to 180 degrees; "1 1" indicates the third polar quadrant Q3 from 180 to 270 degrees; and "1 0" indicates the fourth polar quadrant Q4, from 270 to 360 degrees of the instantaneous angle $\theta$ of the angular displacement of shaft 31. Track 32a provides X signals representing the left bit and track 32b provides Y signals representing the right bit of the two bit reflected binary code. Encoder 30 together with the antiambiguity track 14a of disc 14 and its associated sensing means provide a well-known two brush antiambiguity control to determine correct pulse signal transmission by network 40, and count-up/count-down operation of counters 80 and 85.

Referring to FIGURE 4, gating network 40 includes a pair of AND gates 41 and 42 generally in parallel with one another. Lines 17s from sensor 16s and 23 from flip flop 22 are connected to the input of AND gate 41. Lines 17c from sensor 16c and 24 from flip flop 22 are connected to the input of gate 42. When flip flop 22 provides qualifying voltage by line 23 to AND gate 41, sine function pulses S applied by line 17s are transmitted by gate output line 41a to the inputs of two AND gates 43 and 44. Conversely, when flip flop 22 provides qualifying voltage to gate 42 by line 24, cosine function pulses C are transmitted by gate output line 42a to the inputs of two AND gates 45 and 46.

When AND gates 43 and 46 are qualified by a control signal transmitted by line 72a from network 50, sine function pulses from AND gate 43 are transmitted by gate output line 43a to an OR gate 47 and applied to sine function counter 80 by gate output line 47a. Sequentially, cosine function pulses C from AND gate 46 are transmitted by gate output line 46a to an OR gate 48 and applied to cosine function counter 85 by gate output line 48a. Conversely, when gates 44 and 45 are qualified by signals transmitted by line 75a of network 50, sine function pulses S from AND gate 44 are transmitted by the gate output line 44a to OR gate 48 and applied to cosine function counter 85 by the gate output line 48a. Sequentially, cosine function pulses C from AND gate 45 are transmitted to OR gate 47 by gate output line 45a and applied to sine function counter 80 by gate output line 47a.

Counters 80 and 85 receive the trains of sine and/or cosine function pulses S and/or C, as disc 14 rotates, and count the respective pulses S and/or C applied thereto. Each time counter 80 or 85 reaches a count point of reset, being a count of 512 for a nine bit counter or 1024 for a ten bit counter, a pulse is applied to the associated step motor and control 90 or 95 via lines 81 or 82, or 86 or 87, respectively, determined by the count-up/count-down operation of the associated counter, as will be further discussed.

Line 17a from the encoder 10 is connected to an AND gate 52 in network 50 and to a second AND gate 51 by an inverter 53. During the first half cycle of rotation of disc 14, sensor 16a is in the opaque zone of track 14a and no antiambiguity signal A is transmitted by line 17a to AND gate 52. Consequently, inverter 53 applies voltage to the input of AND gate 51. Conversely, during the second half cycle of rotation of disc 14, light from source 15 passes through the transparent portion of track 14a and impinges on sensor 16a providing an antiambiguity signal A that is transmitted to the input of AND gate 52 and to inverter 53. Thus, no voltage is applied by inverter 53 to AND gate 51. As reference line 14b of track 14e passes sensor 16e, light from source 15e impinges on sensor 16e provides a pulse E that is applied to both AND gates 51 and 52 by line 17e.

When AND gate 52 is qualified by signal A, pulse E is transmitted by gate output line 52a to set a flip flop 54 and provide qualifying voltage AE that is applied by flip flop output line 56 to the inputs of two AND gates 61 and 62. Conversely, when a qualifying voltage from the inverter 53 is applied to AND gate 51 pulse E is transmitted by gate output line 51a to reset flip flop 54 and provide qualifying voltage $\overline{AE}$ that is applied by flip flop output line 55 to the inputs of AND gates 57 and 58.

When sensors 35a, 35b, 36a and/or 36b are disposed face to face with a transparent portion of the track 32a and/or 32b, the corresponding output line 37a, 37b, 38a, and/or 38b transmit a corresponding signal K, M, L, and/or N to the input of AND gate 57, 58, 61, and/or 62, respectively. When each AND gate 57, 58, 61, or 62 is qualified by signals applied by both lines connected to its input, gate 57 or 61 will transmit a signal to an OR gate 63 by its output 57a or 61a, respectively; while gate 58 or 62 will transmit a signal to an OR gate 64 by its output line 58a or 62a, respectively.

When a signal is applied to the input of OR gate 63, it is in an X' condition and gate output 63a applies a voltage to the inputs of an inverter 65 and two AND gates 69 and 71. Simultaneously, the output 65a of inverter 65 applies no voltage to the inputs of AND gates 67 and 68. Conversely, when no signal is applied to OR gate 63, it is in an $X^0$ condition and no voltage is presented to inverter 65 and to AND gates 69 and 71. Simultaneously, inverter output line 65a applies a voltage to AND gates 67 and 68.

When a signal is applied to the input of OR gate 64, it is in a Y' condition and the gate output 64a applies a voltage to the inputs of an inverter 66 and two AND gates 68 and 69. Simultaneously, output 66a of the inverter 66 applies no voltage to the inputs of AND gates 67 and 71. Conversely, when no signal is applied to the input of OR gate 64, it is in a $Y^0$ state and no voltage is presented to inverter 66 and to AND gates 68 and 69. Simultaneously inverter output line 66a applies a voltage signal Y' to AND gates 67 and 71.

AND gates 67, 68, 69, and 71 are arranged to be qualified when the states of OR gates 63 and 64 are $X^0Y^0$, $X^0Y'$, $X'Y'$, and $X'Y^0$, respectively, corresponding to the reflected binary code used by the two bit encoder 30. Thus, each of the AND gates 67 and 71 represents one of the four quadrants Q1, Q2, Q3, and Q4 and is qualified to pass coded signals dependent upon the quadrant in which the instantaneous angle $\theta$ is included.

Each of the AND gates 67 to 71 is connected to three OR gates to simultaneously provide a gating signal to network 40 and a directional control signal to each counter 80 and 85. Output 67a of AND gate 67 is connected to the inputs of OR gates 72, 73, 74, while output 68a of AND gate 68 is connected to the inputs of OR gates 73, 75, and 76, output 69a of AND gate 69 is connected to the inputs of OR gates 72, 76, 77, and output 71a of AND gate 71 is connected to the inputs of OR gates 74, 75, and 76.

Output 72a of OR gate 72 is connected to the inputs of AND gates 42 and 43 and provide qualifying voltage thereto during operation when instantaneous angle $\theta$ of shaft 31 is in the first or third quadrant. Output 75a of OR gate 75 is connected to the inputs of AND gates 44 and 45 and provides qualifying voltage thereto during operation when instantaneous angle $\theta$ is in the second or fourth quadrant.

Output 73a of OR gate 73 is connected to sine function counter 80 and provides a count-up signal during operation in which instantaneous angle $\theta$ is in the first and second quadrants. Output 76a of gate 76 is connected to sine function counter 80 and provides a count-down signal during operation when instantaneous angle $\theta$ is in the third and fourth quadrants.

Output 74a of gate 74 is connected to cosine function counter 85 and provides a count-up signal during operation when instantaneous angle $\theta$ is in the first and fourth quadrants. Output line 77a of gate 77 is connected to cosine function counter 85 and provides a count-down signal during the operations when instantaneous angle $\theta$ is in the second and third quadrants.

Considering the operation of the novel device, assume the motor 12 has a minimum to maximum operational speed from 3 to 30 revolutions per second, in response to input signal V, corresponding to a variable rate. To facilitate mathematical computations and to maintain logical limitations, further assume sine function track 14s and cosine function track 14c each have 1,000 clock pulses. Thus, under the severest conditions, with a maximum instantaneous rate V of 30 revolutions per second and an instantaneous angle $\theta$ equal to either 0 or 90 degrees in any of the four quadrants, the maximum number of sine or cosine function pulses C or S applied to counter 80 or 85 is at the rate of 30,000 pulses per second. Utilizing a nine bit counter having a maximum count of 512 to provide one control pulse to be applied to the associated step motor 90 or 95, 58 to 59 pulses per second is the maximum counter pulse rate output per second. At the present time, step motors can efficiently respond to 100 pulses per second, therefore, the pulse rate output of a nine bit counter is well within operating limits of the device with the encoder 10 providing a maximum sine or cosine signal of 1,000 pulses per revolution at a maximum rotational speed of 30 revolutions per second.

As an example, assume motor 12 and disc 14 are rotating at 25 revolutions per second, and shaft 31 is displaced to an instantaneous angle $\theta$ equal to 20 degrees. Disc 30 is rotated clockwise 20 degrees. Sensors 35a and 35b are aligned with opaque portions of tracks 30a and 30b, respectively, in the first quadrant Q1, and derive no signals K and M. Sensor 36a is aligned with a transparent portion of track 35a in the fourth quadrant Q4, and is energized by light from source 38, thus deriving signal L that is applied to AND gate 60 of network 50. Sensor 36b is aligned with an opaque portion of track 30b in the fourth quadrant Q4 and derives no signal N.

Arm 18 is rotated 80 degrees clockwise representing a scalar displacement of 20 degrees. As disc 14 rotates, the reference line 14b passes between displaced light source 15e and sensor 16e to provide a pulse E, light from source 15 is blocked by the opaque portion of track 14a and no antiambiguity signal A is derived. In the absence of signal A simultaneously with pulse E, inverter 53 qualifies AND gate 51 to pass the pulse E and reset flip flop 54. With flip flop 54 reset, line 55 provides voltage $\overline{A}E$ to AND gates 57 and 58. Thus, AND gates 57, 58 and 62 are only partially qualified while AND gate 61 is completely disqualified, and no signals are applied to OR gates 63 and 64.

In the absence of signals, OR gates 63 and 64 are in $X^0$ and $Y^0$ states, respectively, providing no voltage to the respective inverters 65 and 66. Inverters 65 and 66 accordingly apply voltage to AND gates 67 and 68, and 69 and 71 respectively, by their respective outputs 65a and 66a. AND gate 67 is the only gate fully qualified to pass a signal to OR gates 72, 73 and 74 by output line 67a. OR gate 72 applies qualifying voltage to AND gates 43 and 46 of network 40. Simultaneously, OR gates 73 and 74 apply count-up signals to counters 80 and 85, respectively, by respective output lines 73a and 74a.

As disc 14 rotates, reference line 14b of track 14d passes head 16 and permits light from source 15 to impinge on sensor 16d thus, deriving a pulse D. Pulse D is applied to set flip flop 22 and provide a voltage to AND gate 41 by line 23. Sine and cosine clock lines passing head 16 pass light from source 15 to sensors 16s and 16c, respectively, producing sine function pulses S and cosine function pulses C that are applied to AND gates 41 and 42, respectively. AND gate 42 is not qualified thus, no cosine function pulses C are permitted to pass.

AND gate 41 being qualified by voltage from flip flop 22 passes sine function pulses S to AND gates 43 and 44. AND gate 44 is not qualified but gate 43, qualified by voltage from OR gate 72, passes sine function pulses S to OR gate 47 that applies the pulses to counter 80 by line 47a. Counter 80 receiving a count-up signal from OR gate 73 starts operating.

When disc 14 has rotated 80 degrees or 20 scalar degrees, 342 sine function pulses S have been applied to sine function counter 80 and reference line 14b of track 14e aligns with light source 15e to pass light rays therefrom to impinge on sensor 16e. Sensor 16e thus energized derives a pulse E that is applied simultaneously by line 17e to network 50 and to reset flip flop 22. Reset flip flop 22 rescinds qualifying voltage from AND gate 41, thus blocking sine function pulses from counter 80, and simultaneously applies qualifying voltage to AND gate 42.

Cosine pulses C applied to gate 42 are transmitted to AND gates 45 and 46 by line 42a. AND gate 45 is not qualified and block cosine function pulses C while gate 46, qualified by voltage applied by line 72a, passes cosine function pulses C to OR gate 48 by line 46a. Cosine function pulses C applied to gate 48 are applied to cosine function counter 85 by line 48a until one revolution of disc 14 is completed and counter 85 has received 940 cosine function pulses. Inasmuch as counter 85 produces one control pulse in response to 512 input pulses, the one control pulse is applied to step motor 95 and the counter maintains a count of 428.

At the end of each revolution of disc 14, reference line 14b of track 14d passes head 16 and permits light from source 15 to impinge on sensor 16d. Sensor 16d thus energized produces a pulse D that is transmitted by line 17d to set flip flop 22. Flip flop 22 being set, rescinds qualifying voltage from AND gate 42 and cosine function pulses C are now blocked. Simultaneously, qualifying voltage is applied to AND gate 41 and sine function pulses S are now passed to counter 80 as previously described.

In the present example, disc 14 is rotating at 25 r.p.s., thus in one second 8,550 sine function pulses S are applied to counter 80 providing 16 control pulses to step motor 90, and leaving a count of 378 in the associated counter. During the same period, 23,500 cosine function pulses C are applied to counter 85 providing 43 control pulses to step motor 95, and leaving a count of 484 in the associated counter.

Therefore, the novel device as described herein, includes encoder means to derive pulse signals in response to shaft displacement and/or rotation that are applied to a digital counter for deriving integrated digital signals representing vector components corresponding to rate and angle functions for an elapsed time.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A resolving and integrating device comprising encoder means having inputs adapted to receive signals representing angle and rate information and deriving gate control pulses and two trains of pulses at a rate corresponding to the instantaneous rate of the rate signal, the pulses of each train representing a function of the instantaneous angle of the angle signal, gate means connected to the encoder means and selectively transmitting the pulse trains in response to gate control pulses, and output means including digital counters connected to the gate means for receiving the pulse trains, each of the output means providing an output representing an angular function and corresponding to the sum of the pulses of the associated pulse trains received during a period of time.

2. A resolving and integrating device for deriving an output representing rate and angular functions, comprising encoder means having inputs adapted to receive signals representing angle and rate information and deriving two trains of pulses at a rate corresponding to the instantaneous rate of the rate signal, the pulses of each train representing a function of the instantaneous angle of the angle signal when the instantaneous angle is included in one of two polar quadrants and representing the function represented by the pulses of the other train when the instantaneous angle is included in one of two other polar quadrants, the encoder means providing signals representing the polar quadrant that includes the instantaneous angle, a logic circuit connected to the encoder means for providing control signals in response to the signals representing the polar quadrant that includes the instantaneous angle, means including counters each providing an output corresponding to one of the angular functions and representing the sum of the pulses of the trains of pulses applied thereto during a period of time, and gate means connected to the logic circuit and connecting the encoder means to each output means for applying each of the trains of pulses to a corresponding counter in response to a control signal when the instantaneous angle is included in one of the two polar quadrants and for applying each of the trains of pulses to the other counter in response to a control signal when the instantaneous angle is included in one of the other two polar quadrants.

3. The resolving and integrating device according to claim 2, in which the logic circuit derives directional control signals in response to the signals representing a polar quadrant and is connected to each of the output means for applying the directional control signals to increase and decrease each output in response to the trains of pulses as determined by the angular function and the polar quadrant that includes the instantaneous angle.

4. A resolving and integrating device for deriving an output representing vector components, comprising an encoder adapted to receive signals representing an angle for deriving coded signals representing a polar quadrant that includes the instantaneous angle according to the signals, a logic network connected to the encoder for deriving control signals in response to the coded signals, a function encoder adapted to receive signals representing a rate for deriving trains of pulses representing sine and cosine functions and set pulses all at a rate corresponding to the instantaneous rate according to the rate signal, the function encoder being connected to the encoder and adjusted thereby to derive reset pulses corresponding to the instantaneous angle, output means responsive to the trains of pulses over a period of time one providing an output representing a sine function vector component and another providing an output representing a cosine function vector component, and a gating network connected to the encoder and having control means responsive to the set and reset pulses for alternately transmitting trains of sine and cosine function pulses representing the instantaneous angles, the gating network being connected to each output means and to the logic network for applying the transmitted trains of sine function pulses to derive the output representing the sine function vector component and the trains of cosine function pulses to derive the output representing the cosine function vector component in response to control signals from the logic network when the instantaneous angle is included in the first and third polar quadrants and for reversely applying the trains of sine and cosine function pulses in response to the control signal when the instantaneous angle is included in the second and fourth polar quadrants.

5. The resolving and integrating device according to claim 4, in which the logic network is connected to apply directional control signals in response to the coded signals for deriving increasing and decreasing outputs depending upon the angular function and the polar quadrant that includes the instantaneous angle.

6. The resolving and integrating device according to claim 5, in which the function encoder provides trains of pulses representing sine and cosine functions of 90° and is connected to the encoder for adjustment that is a scalar displacement representing the instantaneous angle relative to a polar quadrant.

7. The resolving and integrating device according to claim 5, and having a two brush antiambiguity arrangement to insure providing code signals to the logic network representing the polar quadrant that includes the instantaneous angle, comprising sensing means in the encoder for deriving lead and lag signals representing a polar quadrant, means in the function encoder for deriving antiambiguity signals, and gate means connected to the signal deriving means and being responsive to the lead and lag signals and the antiambiguity signals for passing the coded signals representing the polar quadrant that includes the instantaneous angle.

8. Encoder means for deriving signals in a resolving and integrating device having means for using the signals to provide an output representing rate and angular functions, comprising inputs adapted to receive signals representing rate and angle information, a memory member having a reference point and two circular tracks representing pulses corresponding to 90° sine and cosine functions and rotating in response to the rate signal, fixed sensing means cooperating with the memory member to derive a set pulse in response to each revolution of the member and trains of pulses representing sine and cosine functions of 90° at a rate corresponding to the instantaneous rate of the rate signal, sensing means rotatably displaceable from the fixed sensing means in which one revolution represents a 90° scalar angle and cooperating with the reference point to derive a reset pulse corresponding to the instantaneous angle in response to each revolution of the function memory member, a second memory member having information representing four polar quadrants, a member having sensing means cooperating with the memory members, one of the members being displaceable relative to the other in response to the angular information signal to derive signals representing the polar quadrant that includes the instantaneous angle represented by the angle signal and being connected to rotate the rotatably displaceable sensing means to its scalar value representing the corresponding instantaneous angle.

9. The encoder means according to claim 8 and having a two brush antiambiguity arrangement comprising a signal track on the function memory member cooperating with the fixed sensing means to derive an antiambiguity signal during one half of each revolution of the function memory member, means for receiving the antiambiguity signals and being responsive to each reset pulse for providing a qualifying signal in the presence of the antiambiguity signal and for providing an alternate qualifying signal in the absence of the antiambiguity signal, the member having sensing means cooperating with the second memory member providing lead and lag signals corresponding to a polar quadrant, and gate means providing coded signals representing to the polar quadrant that includes the instantaneous angle of the angle information signals in response to the lead and lag signals and the qualifying signals.

10. A resolving and integrating device comprising encoder means having inputs adapted to receive signals representing angle and rate information, a memory member having a reference point and two circular tracks representing pulses corresponding to 90° sine and cosine functions and rotating in response to the rate signal, fixed sensing means cooperating with the memory member to derive a set pulse in response to each revolution of the member and trains of pulses representing sine and cosine functions of 90° at a rate corresponding to the instantaneous rate of the rate signal, sensing means rotatably displaceable from the fixed sensing means in which one revolution represents a 90° scalar angle and cooperating with the reference point to derive a reset pulse corresponding to the instantaneous angle in response to each revolution of the function memory member, a second memory member having information representing four polar quadrants, a member having a sensing means cooperating with the memory members, one of the members being displaceable relative to the other in response to the angular information signal to derive signals representing the polar quadrant that includes the instantaneous angle represented by the angle signal and being connected to rotate the rotatably displaceable sensing means to its scalar value representing the corresponding instantaneous angle, gate means connected to the encoder means and selectively transmitting the pulse trains in response to gate control pulses and output means including digital counters connected to the gate means for receiving the pulse trains, each of the output means providing an output representing an angular function and corresponding to the sum of the pulses of the associated pulse train received during a period of time.

References Cited by the Examiner
UNITED STATES PATENTS

| | | | |
|---|---|---|---|
| 2,436,178 | 2/48 | Rajchman | 235—154 |
| 2,532,158 | 11/50 | Ewing | 235—187 |
| 2,740,583 | 4/56 | Holden | 235—189 |
| 2,779,539 | 1/57 | Darlington | 235—154 |
| 2,874,903 | 2/59 | Bock et al. | 235—189 |
| 2,995,302 | 8/61 | Ingwerson et al. | 235—152 |
| 3,014,659 | 12/61 | Dickinson | 235—152 |

MALCOLM A. MORRISON, *Primary Examiner.*

C. D. ANGEL, WALTER W. BURNS, *Examiners.*